(12) United States Patent
Eckel

(10) Patent No.: US 9,787,173 B2
(45) Date of Patent: Oct. 10, 2017

(54) MULTILEVEL CONVERTER

(71) Applicant: SIEMENS AKTIENGESELLSCHAFT, Munich (DE)

(72) Inventor: Hans-Guenter Eckel, Rostock (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/025,309

(22) PCT Filed: Sep. 8, 2014

(86) PCT No.: PCT/EP2014/069057
§ 371 (c)(1),
(2) Date: Mar. 28, 2016

(87) PCT Pub. No.: WO2015/043933
PCT Pub. Date: Apr. 2, 2015

(65) Prior Publication Data
US 2016/0233758 A1   Aug. 11, 2016

(30) Foreign Application Priority Data

Sep. 26, 2013 (DE) .................. 10 2013 219 466

(51) Int. Cl.
*H02M 1/32*   (2007.01)
*H02M 7/483*   (2007.01)
*H02M 7/797*   (2006.01)

(52) U.S. Cl.
CPC ............. *H02M 1/32* (2013.01); *H02M 7/483* (2013.01); *H02M 7/797* (2013.01); *H02M 2007/4835* (2013.01)

(58) Field of Classification Search
CPC ................. H02M 1/32; H02M 1/0061; H02M 2001/0048; H02M 2001/325; H02M 2007/4835; H01H 33/6662; H02H 7/122
(Continued)

(56) References Cited

U.S. PATENT DOCUMENTS 8,638,576 B2    1/2014  Hosini et al.
9,372,493 B2 *  6/2016  Aiello
(Continued)

FOREIGN PATENT DOCUMENTS

DE    102011004733 A1    8/2012
DE    102011006988 A1    10/2012
(Continued)

OTHER PUBLICATIONS

NPL Rainer Marquardt et al; "Modulares Stromrichterkonzept für Netzkupplungsanwendugen bei hohen Spannungen"; [Modular Power Converter Concept for Network Coupling Applications at High Voltages]; Institut für elektrische Antriebstechnik, Leistungselektronik und Steuerungen der Universität der Bundeswehr München, ETG Fachtangung Bauelemente der Leistungselektronik und ihre Anwendungen, 2002, Bad Nauheim, pp. 151-163, XP08105719—English translation.

*Primary Examiner* — Yemane Mehari
(74) *Attorney, Agent, or Firm* — Laurence Greenberg; Werner Stemer; Ralph Locher

(57) ABSTRACT

A multilevel converter has a plurality of series-connected sub modules, which each have at least one first switch, one second switch and one capacitor. Current is output by way of the capacitor during discharging phases and current is received or charging the capacitor during charging phases. At least one of the sub modules has two part-modules that are galvanically connected to each other or are formed by two part-modules that are galvanically connected to each other. Each has a first switch, a second switch and a (Continued)

capacitor, and a first and a second part-module terminal. The galvanic connection between the two part-modules includes at least one inductive element.

18 Claims, 8 Drawing Sheets

(58) Field of Classification Search
USPC .......................... 363/13, 27.01, 56.01–56.12
See application file for complete search history.

(56) References Cited

U.S. PATENT DOCUMENTS

| | | | |
|---|---|---|---|
| 9,473,013 B2* | 10/2016 | Singh Riar | ............ H02M 7/487 |
| 2008/0232145 A1* | 9/2008 | Hiller | ................... H02H 7/1225 |
| | | | 363/56.01 |
| 2013/0026841 A1 | 1/2013 | Hosini et al. | |
| 2013/0328541 A1 | 12/2013 | Euler et al. | |
| 2014/0226373 A1 | 8/2014 | Park et al. | |
| 2014/0254219 A1 | 9/2014 | Davies | |

FOREIGN PATENT DOCUMENTS

| | | |
|---|---|---|
| EP | 2254228 A1 | 11/2010 |
| JP | 2014522230 A | 8/2014 |
| WO | 2011116816 A1 | 9/2011 |
| WO | 2012098610 A1 | 7/2012 |
| WO | 2013023248 A1 | 2/2013 |

* cited by examiner

MULTILEVEL CONVERTER

BACKGROUND OF THE INVENTION

FIELD OF THE INVENTION

The invention relates to a multilevel converter having a plurality of series-connected sub modules (SB), which each comprise at least one first switch, one second switch and one capacitor and output current toward the outside by means of the capacitor in discharging phases and receive current for charging the capacitor in charging phases.

Such a multilevel converter is described in the conference paper "Modulares Stromrichterkonzept für Netzkupplungsan-wendungen bei hohen Spannungen" ["Modular converter concept for grid coupling applications at high voltages"] (Rainer Marquardt, Anton Lesnicar and Jürgen Hildinger, Institute for electrical drive engineering, power electronics and control systems at the Bundeswehr University Munich, ETG specialist conference: Components in power electronics and their applications, 2002, Bad Nauheim). The previously known multilevel converter is equipped with a plurality of series-connected sub modules, which each comprise a first switch, a second switch and a capacitor and output current toward the outside by means of the capacitor in discharging phases and receive current for charging the capacitor in charging phases. A central processor serves for controlling the mode of operation of the multilevel converter.

In previously known multilevel converters there is the problem that, in the case of a failure of one of the sub modules, for example in the case of an abrupt discharge of the capacitor, if both switches of the sub module are switched on in a faulty way, destruction of the sub module can occur and the sub module housing can rupture. Such rupture of sub module housings can detrimentally affect other neighboring sub modules, with the result that the latter likewise fail on account of the mechanical action and in turn carry short-circuit currents. In other words, a chain reaction can occur which can result in all the sub modules of the multilevel converter being destroyed.

In order to prevent the above-described problem of rupture of the sub module housings or a chain reaction of destruction of sub modules, previously known multilevel converters are provided with particularly stable sub module housings; however, this results in a very high weight of the multilevel converters and in use of a very large amount of material.

Alternatively, it is known to choose the capacitance of the capacitors of the sub modules to be small enough that the loading that occurs in the case of a short-circuit current in the sub modules remains low enough that rupture of the sub module housings is avoided.

BRIEF SUMMARY OF THE INVENTION.

The invention is based on the object of specifying a multilevel converter in which the above-described problem of destruction of the sub modules is avoided, at least reduced, particularly simply and cost-effectively.

This object is achieved according to the invention by means of a multilevel converter comprising the features as claimed. Advantageous configurations of the multilevel converter according to the invention are specified in dependent claims.

Accordingly, the invention provides that at least one of the sub modules comprises two partial modules which are galvanically connected to one another or is formed by two partial modules which are galvanically connected to one another and which each comprise a first switch, a second switch and a capacitor and also a first and a second partial module terminal, and the galvanic connection between the two partial modules comprises at least one inductive element.

One major advantage of the multilevel converter according to the invention can be seen in the fact that at least one of the sub modules, preferably all of the sub modules, is/are formed by partial modules which indeed are galvanically connected to one another, and in this respect allow a discharging current between partial modules, but the current flow in the case of a short circuit is limited by the additional inductive element—provided according to the invention—in the galvanic connection between the partial modules. The inventive concept thus consists in splitting the sub modules into partial modules which jointly have the electrical behavior required for the sub module; the partial modules are indeed connected to one another galvanically (that is to say in a manner electrically carrying current) for the functionality of the sub module, but are electrically decoupled from one another by the at least one inductive element in the galvanic connection to an extent such that, in the case of a failure of one of the partial modules, the other partial modules are affected only to a limited extent.

The partial modules of the sub module or sub modules are preferably embodied structurally identically.

The first switch of each partial module is preferably connected in series with the capacitor; the second switch of each partial module is preferably connected in parallel with the series connection formed by the first capacitor and the second capacitor. The first partial module terminal of each partial module is preferably formed by the electrical connection location between the two switches of the partial module and the second partial module terminal of each partial module is preferably formed by the electrical connection point between the capacitor and the second switch.

In order to achieve a sufficient isolation of the partial modules with the aim that a failure of one of the partial modules does not detrimentally affect the other partial module or partial modules too much, it is regarded as advantageous if the inductance of the inductive element or the sum of the inductances of the inductive elements in the galvanic connection between the two partial modules is at least five times, preferably at least ten times, the magnitude of the sum of the parasitic inductances acting in the two partial modules. Such a dimensioning of the inductance of the inductive element generally ensures a sufficient electrical isolation of the partial modules.

With regard to the arrangement of the at least one inductive element, it is regarded as advantageous if the first partial module terminals of the partial modules are each galvanically connected to a first sub module terminal of the sub module and to one another, and the second partial module terminals are each galvanically connected to a second sub module terminal of the sub module and to one another, wherein the galvanic connection between the two first partial module terminals and/or between the two second partial module terminals comprises at least one inductive element. In this arrangement of the inductive element as well, it is particularly advantageous if the inductance of the inductive element or the sum of the inductances of the inductive elements in the galvanic connection between the two first partial module terminals and/or between the two second partial module terminals is at least five times, preferably at least ten times, the magnitude of the sum of the parasitic inductances acting in the two partial modules.

In order to achieve the result that the capacitor voltages of the capacitors of the partial modules are always at least approximately of the same magnitude, it is regarded as advantageous if the partial modules each comprise a third partial module terminal, and the capacitors of the partial modules are galvanically connected with high resistance and/or high inductance with respect to one another via these third partial module terminals. A compensation current between the capacitors of the partial modules is possible via the third partial module terminals, but, on account of the high resistance or the high inductance between the third partial module terminals, it is ensured that even in the case of a failure of one of the partial modules, the other partial modules are sufficiently protected.

In the case of a high-resistance connection of the third partial module terminals with respect to one another, it is regarded as advantageous if the absolute value of the ohmic resistance between the capacitors of the two partial modules is at least a factor of $10^5$ greater than the absolute value of the impedance of the inductive element at power supply system frequency, that is to say at usually 50 Hz or 60 Hz, or the sum of the absolute values of the impedances of the inductive elements at power supply system frequency in the galvanic connection or galvanic connections between the two partial modules.

For the case where the sub module is intended to provide particularly high output powers, it is regarded as advantageous if the sub module is formed from more than two partial modules; accordingly, in one particularly preferred configuration it is provided that the at least one sub module comprises besides the two partial modules further partial modules each comprising a first switch, a second switch and a capacitor and also a first and a second partial module terminal, the first partial module terminals of the further partial modules are each galvanically connected to the first sub module terminal of the sub module, and the second partial module terminals of the further partial modules are each galvanically connected to the second sub module terminal of the sub module, wherein the galvanic connection between the first partial module terminals of the further partial modules and the first sub module terminal and/or the galvanic connection between the second partial module terminals of the further partial modules and the second sub module terminal comprise(s) in each case at least one inductive element.

In other words, it can therefore be provided that the at least one sub module comprises a multiplicity of partial modules each comprising a first switch, a second switch and a capacitor and also a first and a second partial module terminal, the first partial module terminals of the partial modules are each galvanically connected to the first sub module terminal of the sub module, and the second partial module terminals of the partial modules are each galvanically connected to the second sub module terminal of the sub module, wherein the galvanic connection between the first partial module terminals of the partial modules and the first sub module terminal and the galvanic connection between the second partial module terminals of the partial modules and the second sub module terminal each comprise at least one inductive element.

With regard to a compensation of the capacitor voltages of the multiplicity of partial modules, it is regarded as advantageous if the capacitors of the partial modules are galvanically connected with high resistance, and the absolute value of the ohmic resistance between the capacitors of in each case two partial modules connected to one another is in each case at least a factor of $10^5$ greater than the sum of the absolute values of the impedances at 50 Hz which are formed by those inductive elements which are arranged in the galvanic connections between said two partial modules and the sub module terminals.

Preferably, the sum of the inductances of the inductive elements in the galvanic connection between the first partial module terminal and the first sub module terminal and in the galvanic connection between the second partial module terminal and the second sub module terminal for each of the partial modules is in each case at least five times, preferably at least ten times, the magnitude of the sum of the parasitic inductances acting in said partial modules.

Particularly preferably, all the sub modules of the multilevel converter are embodied as described above, that is to say are formed from partial modules; accordingly, it is regarded as advantageous if all of the sub modules of the multilevel converter each comprise at least two partial modules or are formed by at least two partial modules which each comprise a first switch, a second switch and a capacitor and also a first and a second partial module terminal.

The inductive element or inductive elements is or are preferably formed by inductors. Alternatively, it is possible for the inductive element or inductive elements is to be formed by parasitic inductances in the galvanic connections between the partial modules.

Preferably, the driving of the switches of the partial modules is carried out in an inductively decoupled manner.

With regard to an inductive decoupling during driving, it is regarded as advantageous if the at least one sub module or all of the sub modules comprise(s) in each case a first sub module-specific driver circuit and a second sub module-specific driver circuit, and the first switches of the partial modules are driven in an inductively decoupled manner by the first sub module-specific driver circuit and the second switches of the partial modules are driven in an inductively decoupled manner by the second sub module-specific driver circuit.

It is particularly advantageous if a current-compensated inductor is respectively arranged between each first switch and the first sub module-specific driver circuit for inductive decoupling and a current-compensated inductor is respectively arranged between each second switch and the second sub module-specific driver circuit for inductive decoupling.

The invention furthermore relates to a sub module for a multilevel converter such as has been described above. The invention provides that the sub module comprises two partial modules which are galvanically connected to one another or is formed by two partial modules which are galvanically connected to one another and which each comprise a first switch, a second switch and a capacitor and also a first and a second partial module terminal, and the galvanic connection between the two partial modules comprises at least one inductive element.

With regard to the advantages of the sub module according to the invention, reference should be made to the above explanations in association with the multilevel converter according to the invention.

The invention is explained in greater detail below on the basis of exemplary embodiments; in the figures here, by way of example:

In the figures, the same reference signs are always used for identical or comparable components, for the sake of clarity.

DESCRIPTION OF THE INVENTION

Figure 1:
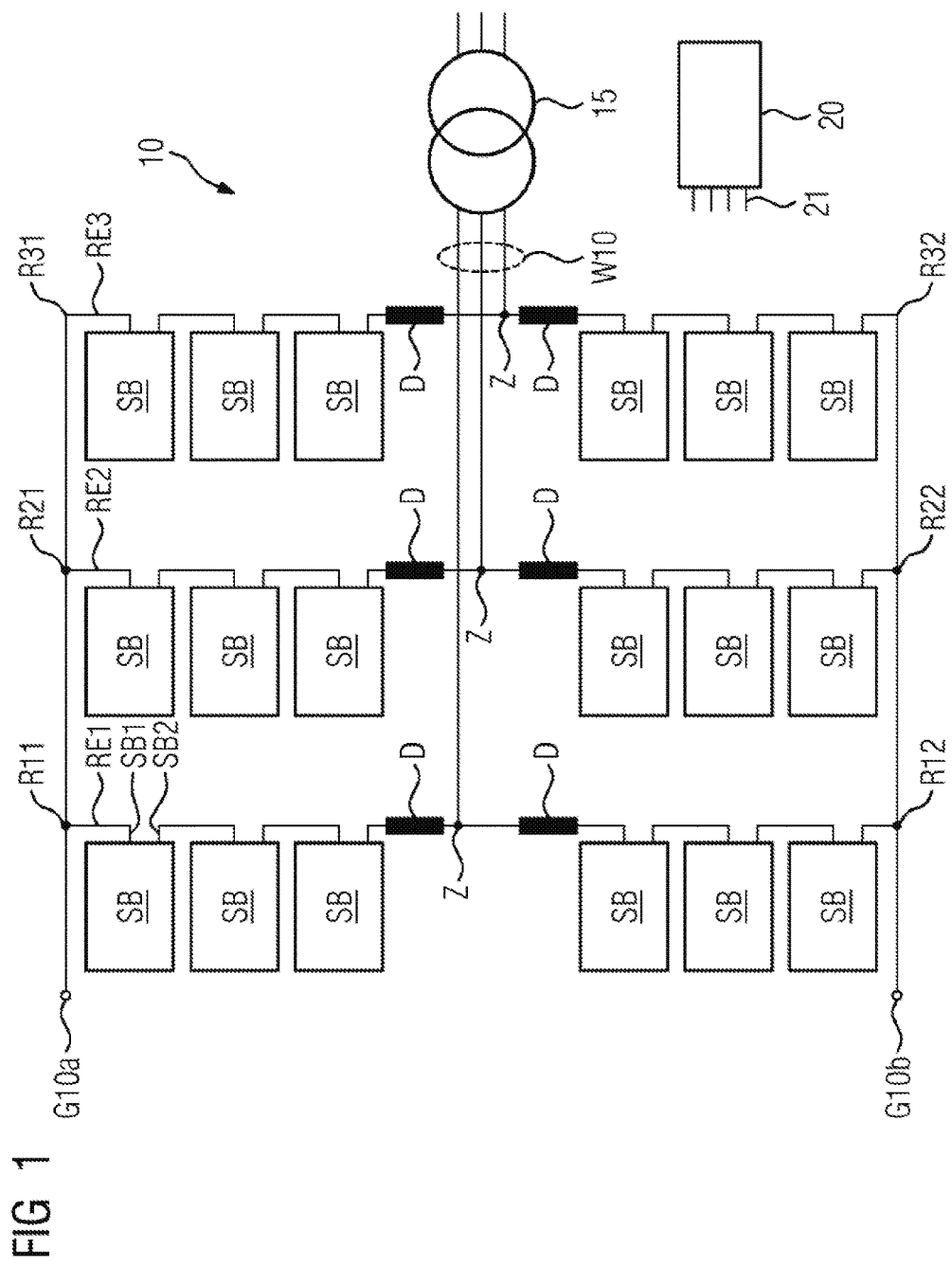
FIG. 1 shows one exemplary embodiment for a multilevel converter equipped with a multiplicity of sub modules.

FIG. 1 shows one exemplary embodiment for a three-phase multilevel converter 10. The latter comprises AC voltage terminals W10 for feeding in or outputting or drawing AC current. However, the multilevel converter 10 is equipped with two voltage terminals G10a and G10b, which are designated as DC voltage terminals.

The multilevel converter 10 comprises three parallel-connected series connections RE1, RE2 and RE3, the external terminals R11, R21 and R31 of which are connected to the DC voltage terminal G10a. The external terminals R12, R22 and R32 are connected to the DC voltage terminal G10b. In other words, the external terminals of the three series connections RE1, RE2 and RE3 thus form the DC voltage side of the multilevel converter 10.

Each of the three series connections RE1, RE2 and RE3 is respectively equipped with a multiplicity of series-connected sub modules SB and two inductances D. An intermediate terminal Z is in each case situated between the two inductances D, said intermediate terminal, in terms of its potential, being between the upper sub modules in FIG. 1 and the lower sub modules in FIG. 1 and forming one of the three AC voltage terminals W10 of the multilevel converter 10. The three AC voltage terminals W10 can be connected to a generator 15, for example.

Furthermore, by way of example, the connection or the interconnection of the sub modules SB can be discerned in FIG. 1. Each of the sub modules SB is respectively equipped with a first sub module terminal SB1 and a second sub module terminal SB2.

In the case of the multilevel converter 10 in accordance with FIG. 1, the sub modules SB are driven by a central processor 20. The connections between the central processor 20 and the sub modules SB that are provided for the driving by the central processor 20 are not shown in FIG. 1 for reasons of clarity, but rather are merely indicated schematically by means of lines 21.

Figure 2:
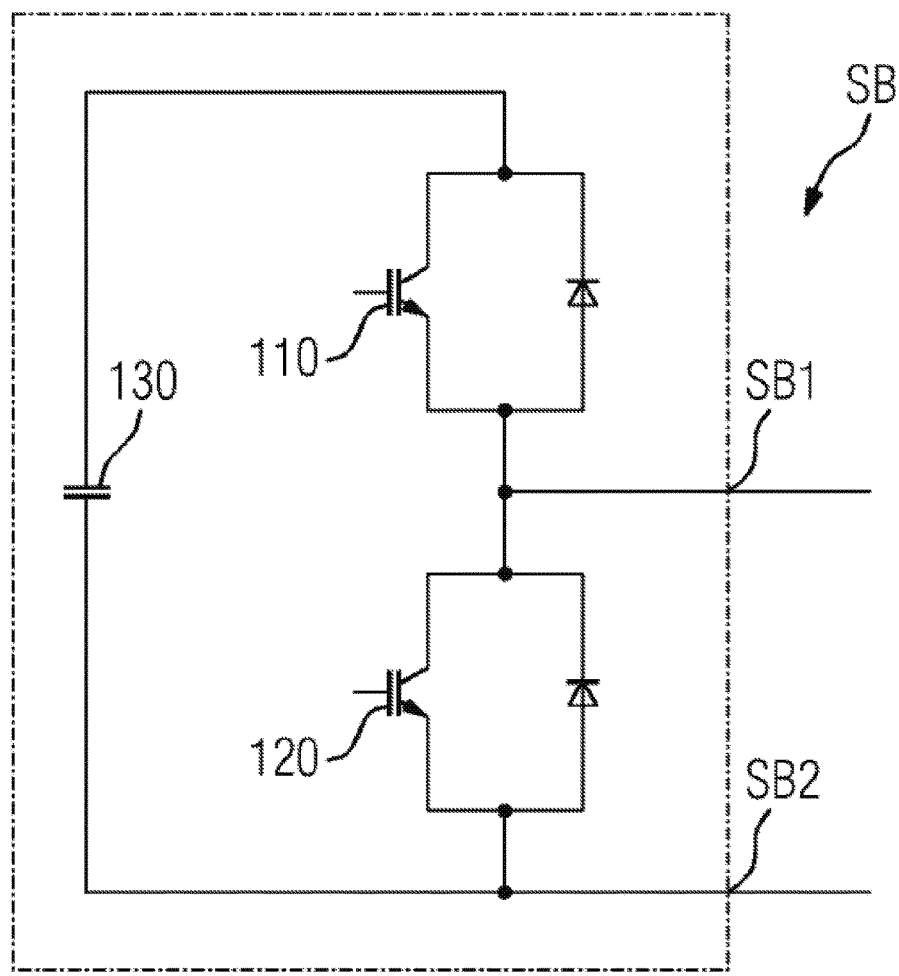
FIG. 2 shows for general elucidation, a previously known sub module that can be used in the multilevel converter in accordance with FIG. 1 for forming a previously known multilevel converter.

In order to afford a better understanding of the explanations below, FIG. 2 shows a sub module SB such as is used in the multilevel converter previously known from the document cited in the introduction. The sub module SB comprises a first switch 110, a second switch 120, a capacitor 130, a first sub module terminal SB1 and a second sub module terminal SB2. If, in the sub module, one of the switches 110 or 120 fails and both switches turn on simultaneously, then the entire energy stored in the capacitor 130 is released, with the result that mechanical destruction of the sub module SB and, under certain circumstances, mechanical destruction of neighboring sub modules can occur.

Figure 3:
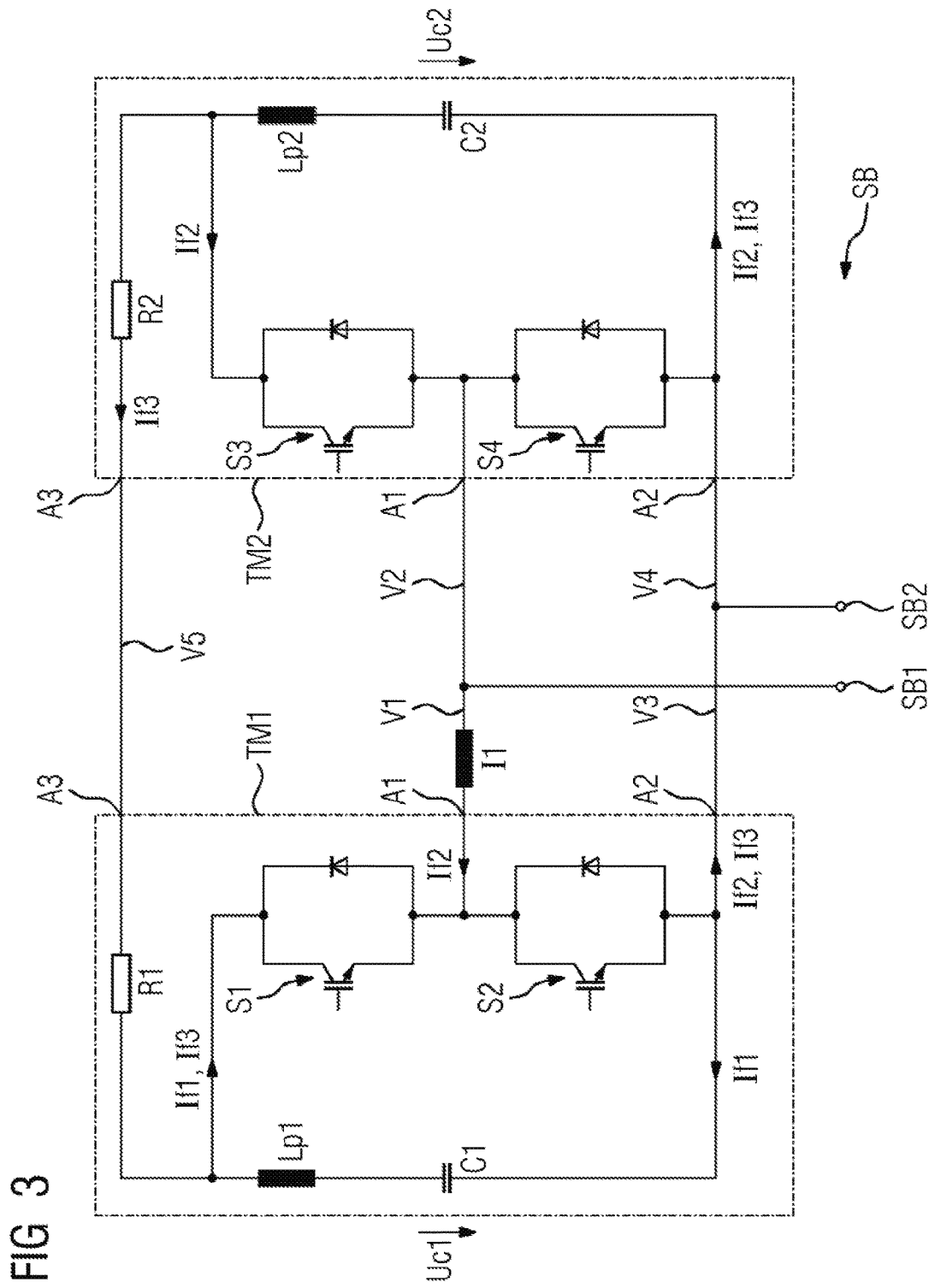
FIG. 3 shows one exemplary embodiment for a sub module according to the invention which, when used in the multilevel converter in accordance with FIG. 1, leads to a multilevel converter according to the invention.

FIG. 3 shows a first exemplary embodiment for a sub module SB according to the invention, which comprises two partial modules TM1 and TM2 and can be used in the multilevel converter 10 in accordance with FIG. 1 in order to form a multilevel converter according to the invention.

The partial module TM1 comprises a first switch S1, a second switch S2, a capacitor C1 and also an ohmic resistance R1. The two switches S1 and S2 are preferably formed in each case by a transistor and a diode connected in parallel with the respective transistor.

The first switch S1 is connected in series with the capacitor C1; the series connection formed by the switch S1 and the capacitor C1 is connected in parallel with the second switch S2.

A first partial module terminal A1 of the partial module TM1 is electrically connected to the connection location between the two switches S1 and S2. A second partial module terminal A2 is electrically connected to the connection location between the second switch S2 and the capacitor C1.

In the exemplary embodiment in accordance with FIG. 3, the partial module TM1 is additionally also equipped with a third partial module terminal A3, which is electrically connected to an ohmic resistance R1 of the partial module TM1 and is connected to the capacitor C1 via said ohmic resistance R1.

The partial module TM2 is preferably structurally identical to the partial module TM1. In this regard, the partial module TM2 preferably likewise comprises a first switch S3, a second switch S4, a capacitor C2 and an ohmic resistance R2. The two switches S3 and S4, the capacitor C2 and the ohmic resistance R2 are preferably interconnected in the same way as is the case for the partial module TM1; with regard to the interconnection of the components of the partial module TM2, therefore, reference should be made to the above explanations in association with the interconnection of the components of the partial module TM1.

Parasitic inductances act in each case in the two partial modules TM1 and TM2, said parasitic inductances being identified by the reference signs Lp1 and Lp2 in the illustration in accordance with FIG. 3.

The first partial module terminal A1 of the partial module TM1 is galvanically connected to the first partial module terminal A1 of the partial module TM2 and forms with it a first sub module terminal SB1 of the sub module SB. The galvanic connection line between the first partial module terminal A1 of the partial module TM1 and the first sub module terminal SB1 of the sub module SB is identified by the reference sign V1 in FIG. 3. The galvanic connection line between the first partial module terminal A1 of the partial module TM2 and the first sub module terminal SB1 bears the reference sign V2 in FIG. 3.

The two second partial module terminals A2 of the two partial modules TM1 and TM2 are likewise connected to one another via connection lines V3 and V4 and to the second sub module terminal SB2.

The third partial module terminals A3 of the two partial modules TM1 and TM2 are connected via a connection line V5.

During the normal operation of the sub module SB in accordance with FIG. 3, the two first switches S1 and S3 of the two partial modules TM1 and TM2 are switched off and on jointly in each case; the same correspondingly applies to the two second switches S2 and S4 of the two partial modules TM1 and TM2. The first and second switches of the two partial modules TM1 and TM2 here are switched on and off in each case alternately in such a way that, in each of the two partial modules TM1 and TM2, in each case either the first switch S1 or respectively S3 or the second switch S2 or respectively S4 is switched on; the respective other switch is then switched off. Such driving ensures that the capacitor of the respective partial module is not short-circuited by the respective switches of the partial module and abruptly discharged.

In order to achieve the effect—during the normal operation of the sub module SB—that the two capacitors C1 and C2 of the two partial modules TM1 and TM2 in each case have the same capacitor voltage Uc1 and Uc2, respectively, the connection line V5 is provided, which allows compensation current between the two capacitors C1 and C2 via the two ohmic resistances R1 and R2; in other words, the compensation current has the effect that the two capacitor voltages Uc1 and Uc2 will be at least approximately of the same magnitude.

FIG. 3 furthermore reveals an inductive element I1 provided in the galvanic connection line V1. The inductive element I1 is preferably an inductor. The function of the inductive element I1 consists in reducing a discharging current between the two partial modules TM1 and TM2 in the case of a fault or failure of one of the two partial modules; this will be explained in greater detail below on the basis of an example:

It is assumed by way of example below that the two first switches S1 and S3 of the two partial modules TM1 and TM2 are switched on and the two second switches S2 and S4 of the two partial modules TM1 and TM2 are switched off. If there is then a failure of the second switch S2 of the partial module TM1 and the second switch S2 is turned on, then the capacitor C1 of the partial module TM1 is short-circuited and discharged via the already switched on first switch S1 and the failed second switch S2. The discharging current If1 thus flows through the first switch S1 and the second switch S2 in the partial module TM1. In the partial module TM1, the capacitance of the capacitor C1 is preferably chosen in such a way that the discharging current If1 flowing through the two switches S1 and S3 will not lead to complete mechanical destruction of the partial module TM1.

The second partial module TM2 is likewise affected by the failure of the partial module TM1. This is because the failure of the second switch S2 of the partial module TM1 makes possible a discharging current If2 with which the capacitor C2 of the partial module TM2 is discharged. Said discharging current If2 flows via the first switch S3 of the partial module TM2 via the galvanic connection lines V2 and V1 through the second switch S2 of the partial module TM1 and subsequently via the connection lines V3 and V4 back to the partial module TM2 again. Said discharging current If2 is effectively limited by the inductive element I1 which is provided in the galvanic connection line V1 and keeps the magnitude of the discharging current If2 at a noncritical level. The discharging current If2 is preferably limited to a value which precludes destruction of the partial module TM2.

In order to achieve the above-described function of current limiting by the inductive element I1, the inductance L1 of the inductive element I1 is preferably at least five times, particularly preferably at least ten times, the magnitude of the sum of the parasitic inductances Lp1 and Lp2 acting in two partial modules. The following thus preferably holds true:

$$L1 > 5 \cdot Lp1 \text{ where } Lp1 \approx Lp2$$

On account of the connection line V5, besides the discharging current If2, a discharging current If3 can also occur, by which the capacitor C2 is discharged via the partial module TM1. The discharging current If3 can flow via the resistance R2 and via the connection line V5 to the partial module TM1 and can pass back to the partial module TM2 again via the two connection lines V3 and V4. In order to ensure that the discharging current If3 is sufficiently limited, the two ohmic resistances R1 and R2 are preferably dimensioned in such a way that the absolute value of the ohmic resistance Rtot between the two capacitors C1 and C2 —that is to say the resistance sum of the two ohmic resistances R1 and R2—is at least a factor of $10^5$ greater than the absolute value of the impedance of the inductive element I1 at power supply system frequency, which is usually 50 or 60 Hz. The following thus holds true:

$$Rtot = R1 + R2 > 10^5 * |2*\pi*50 \text{ Hz}*L1| \text{ or}$$

$$Rtot > 10^5 * |2\pi \cdot *50 \text{ Hz} \cdot *5*Lp1|$$

To summarize, the two ohmic resistances R1 and R2 and the inductive element I1 serve to limit a discharging current between partial modules if one of the partial modules has failed and electrically constitutes a short circuit.

Figure 4:
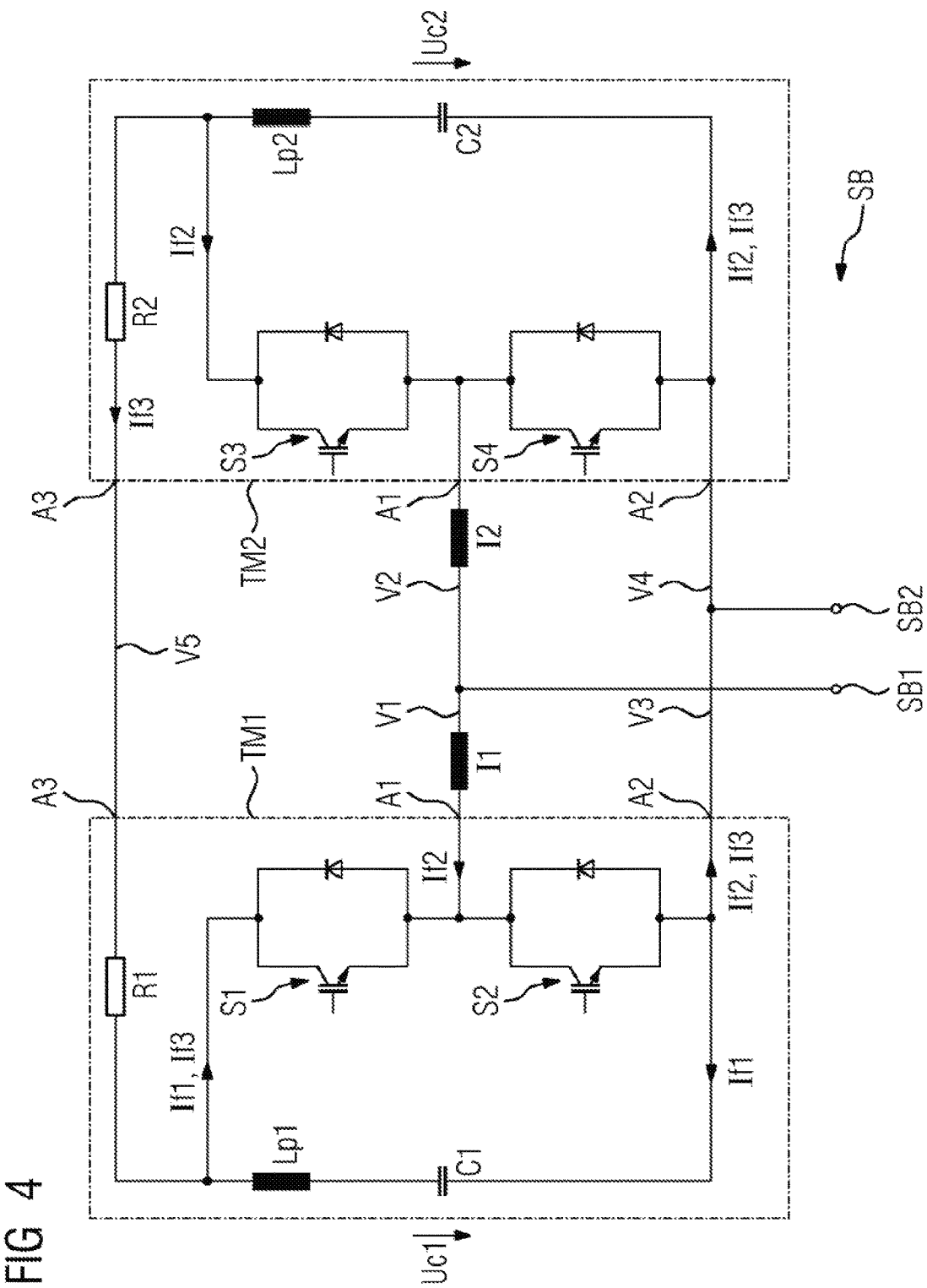
FIG. 4 shows one exemplary embodiment for a sub module according to the invention comprising two inductive elements.

FIG. 4 shows an exemplary embodiment for a sub module SB which is equipped with two inductive elements I1 and I2 that serve jointly for current limiting in the case of a failure of one of the partial modules. In the case of the exemplary embodiment in accordance with FIG. 4, an inductive element I1 is arranged in the galvanic connection line V1 between the first partial module terminal A1 of the partial module TM1 and the first sub module terminal SB1 of the sub module SB and a second inductive element I2 is arranged in the galvanic connection line V2 between the first partial module terminal A1 of the partial module TM2 and the first sub module terminal SB1 of the sub module SB.

The two inductive elements I1 and I2 reduce the discharging current of a partial module that has not failed in the case of the failure of a different partial module that has failed, as has already been explained thoroughly above in association with FIG. 3. The above explanations in association with FIG. 3 thus correspondingly apply to the sub module in accordance with FIG. 4.

The arrangement of an inductive element respectively in each connection line between the first partial module terminal A1 of each partial module and the first sub module terminal SB1 is advantageous particularly if the sub module SB is equipped not just with two partial modules TM1 and TM2, but with further partial modules or with a multiplicity of partial modules. The arrangement of one inductive element per connection line between the first partial module terminal A1 and the first sub module terminal always ensures that in the case of a failure of one of the partial modules, the discharging current of the other partial modules is limited by at least two inductive elements.

Figure 5:
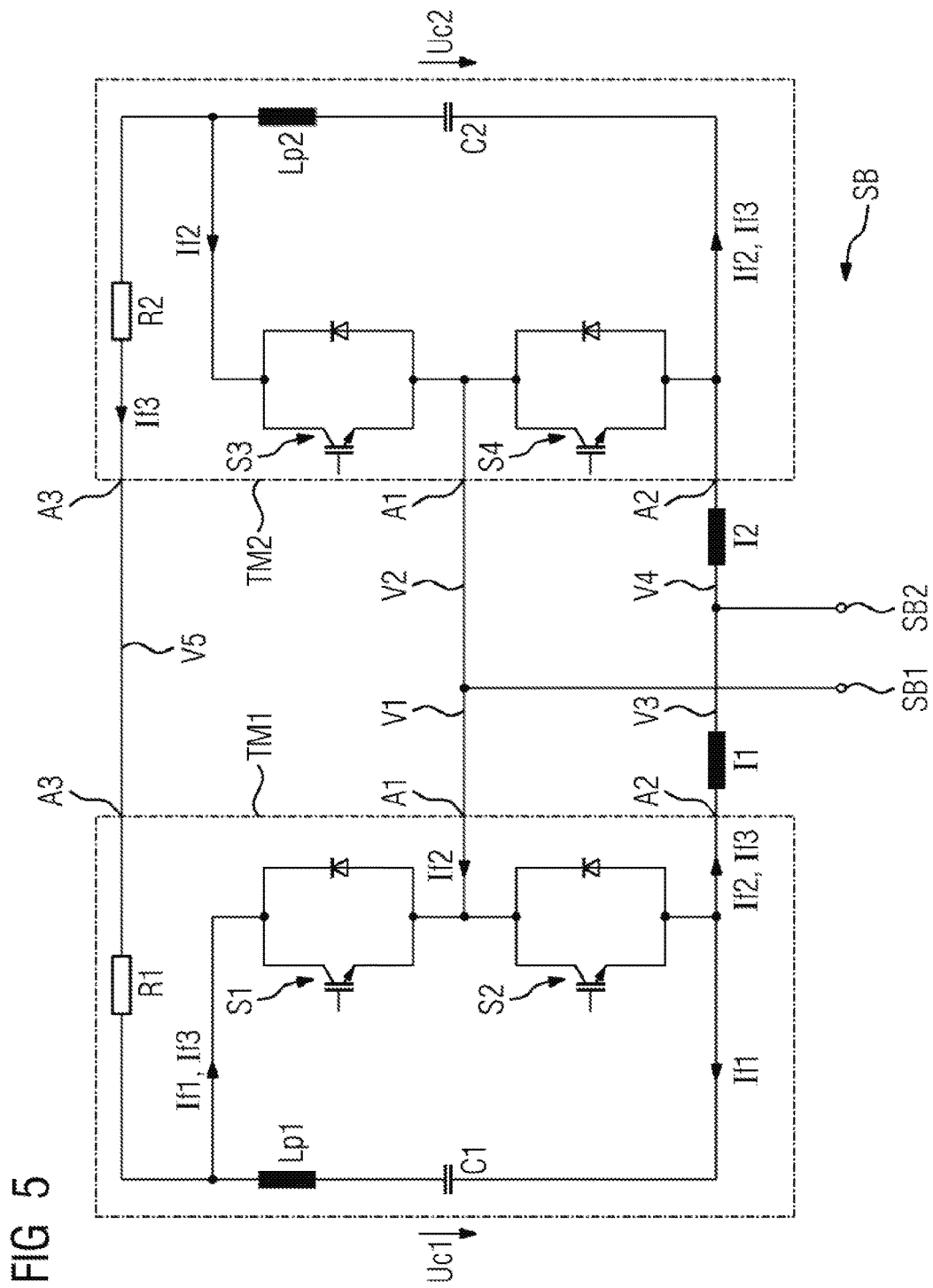
FIG. 5 shows a further exemplary embodiment for a sub module according to the invention comprising two inductive elements.

FIG. 5 shows a further exemplary embodiment for a sub module SB according to the invention which is equipped with two inductive elements I1 and I2 for current limiting in the case of a fault. In contrast to the exemplary embodiment in accordance with FIG. 4, the arrangement of the two inductive elements I1 and I2 is chosen differently in the case of the sub module SB in accordance with FIG. 5. It can thus be discerned that the two inductive elements I1 and I2 are not arranged in the galvanic connection lines V1 and V2 between the two first partial module terminals A1 of the two partial modules TM1 and TM2 and the first sub module terminal SB1, but rather instead in the connection lines V3 and V4 that produce a connection between the second partial module terminals A2 and the second sub module terminal SB2. With regard to the functioning of the two inductive elements I1 and I2, reference should be made to the above explanations in association with the two inductive elements I1 and I2 in accordance with FIG. 4 or the inductive element I1 in accordance with FIG. 3.

The arrangement of an inductive element respectively in each connection line between the second partial module terminal A2 of each partial module and the second sub module terminal SB2 is advantageous particularly if this sub module SB is equipped not just with two partial modules TM1 and TM2, but with further partial modules or with a multiplicity of partial modules. The arrangement of one inductive element per connection line between the second partial module terminal A2 and the second sub module terminal SB2 always ensures that in the case of a failure of one of the partial modules, the discharging current of the other partial modules is limited by at least two inductive elements.

Figure 6:
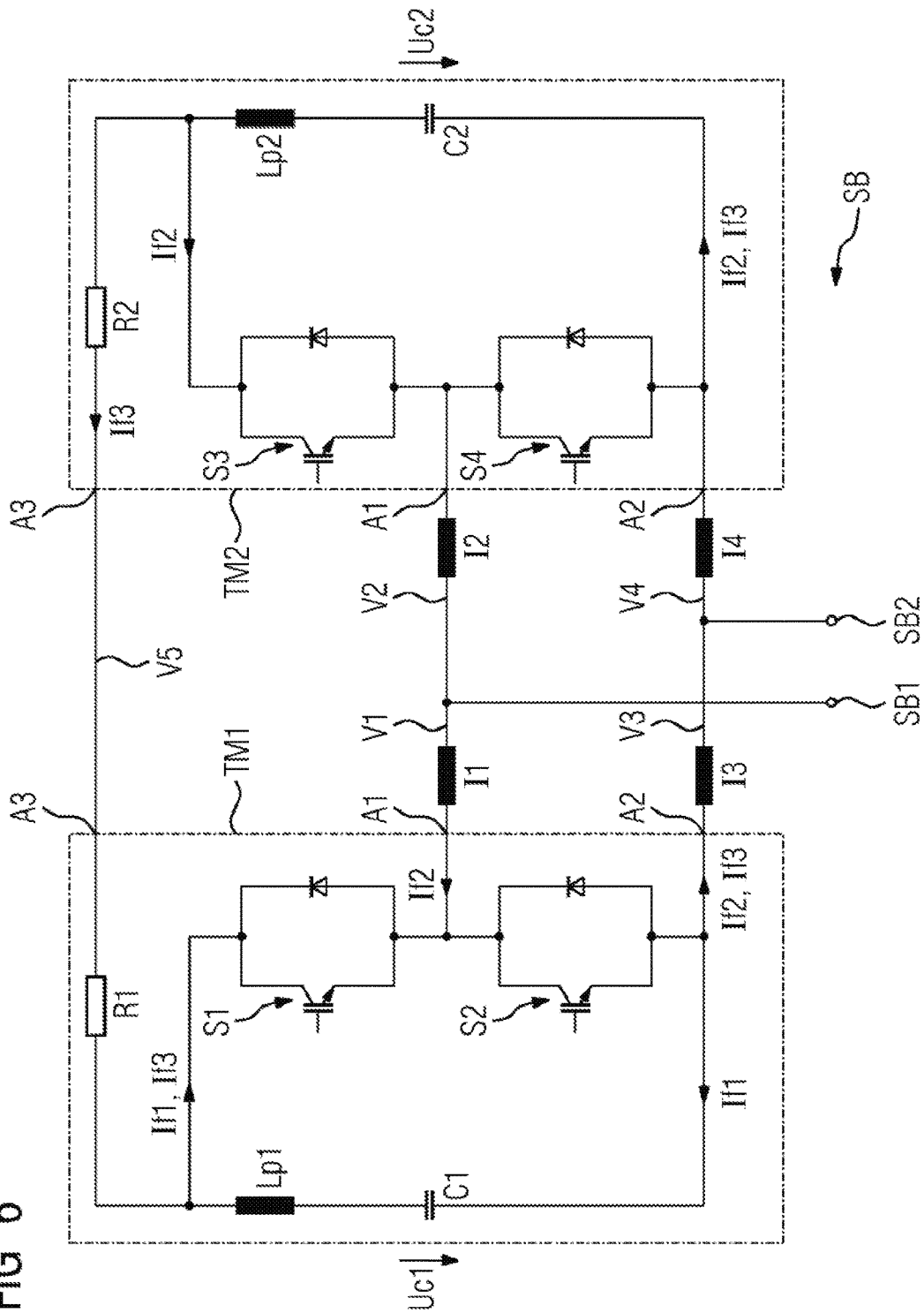
FIG. 6 shows one exemplary embodiment for a sub module according to the invention comprising four inductive elements.

FIG. 6 shows one exemplary embodiment for a sub module SB according to the invention in which each of the galvanic connection lines V1, V2, V3 and V4 is in each case equipped with an inductive element I1, I2, I3 and I4, respectively. The four inductive elements I1 to I4 serve for current limiting in the case of a failure of one of the partial modules, such as has already been explained above in association with FIGS. 3 to 6.

The arrangement of an inductive element in each case in each connection line between the first partial module terminal A1 of each partial module and the first sub module terminal SB1 and also in each connection line between the second partial module terminal A2 of each partial module and the second sub module terminal SB2 is advantageous particularly if the sub module SB is equipped not just with two partial modules TM1 and TM2, but rather with further partial modules or with a multiplicity of partial modules. The arrangement of two inductive elements per partial module ensures that in the case of a failure of one of the partial modules, the discharging current of the other partial modules is limited by at least four inductive elements.

Figure 7:
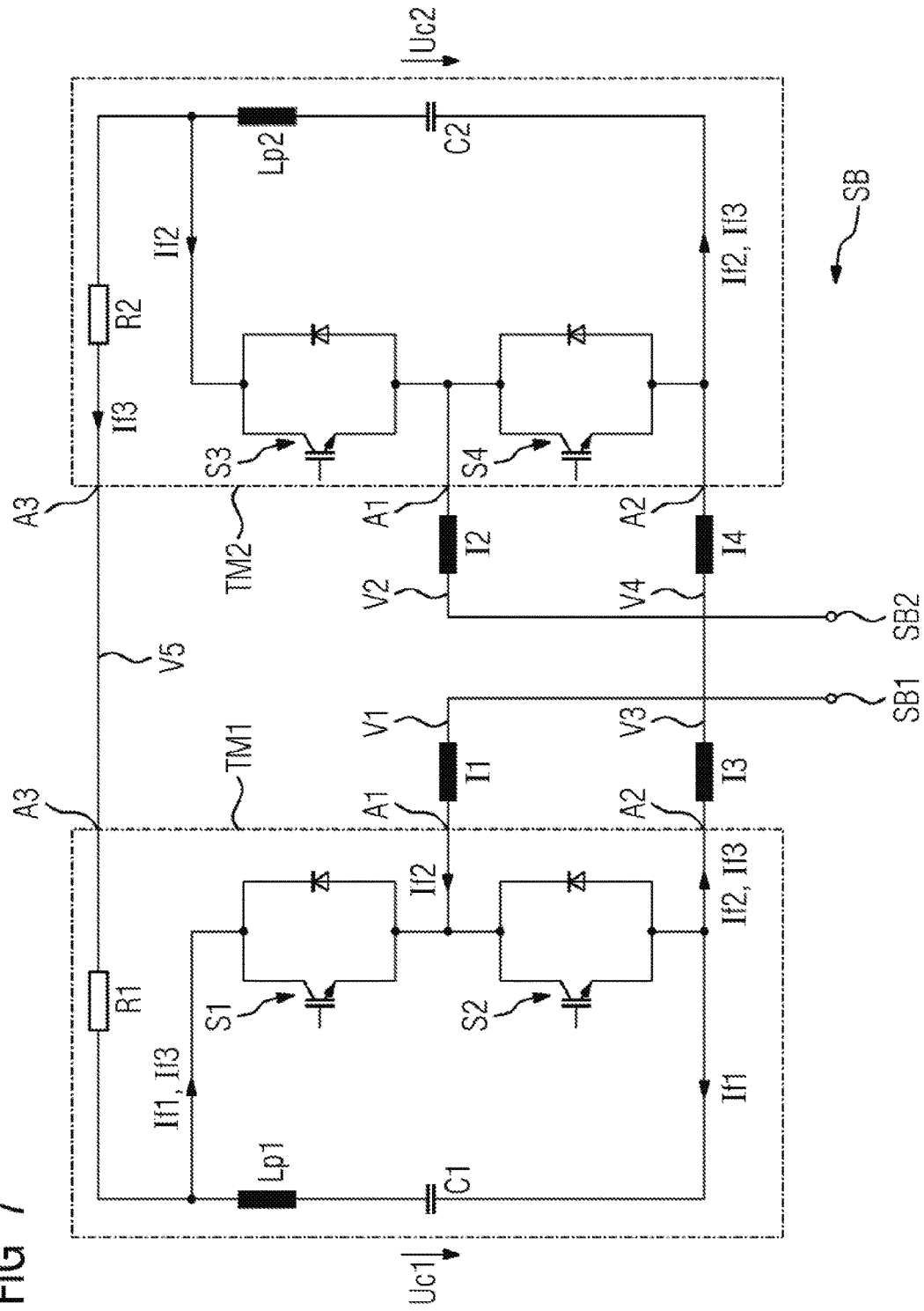
FIG. 7 shows one exemplary embodiment for a sub module according to the invention which makes it possible to generate bipolar output voltages.

FIG. 7 shows one exemplary embodiment for a sub module SB which is suitable for generating bipolar output voltages. As can be discerned in FIG. 7, the connection of the two sub module terminals SB1 and SB2 to the first and second partial module terminals A1 and A2, respectively, of the partial modules TM1 and TM2 is chosen differently, thereby making it possible to generate positive and negative module output voltages at the two sub module terminals SB1 and SB2.

The inductive elements I1 to I4 provided in the galvanic connection lines V1 to V4 serve for current limiting of the discharging currents that can occur in the case of a failure of one of the partial modules; in this regard, reference should be made to the above explanations.

In the case of the sub modules in accordance with FIGS. 3 to 7, emergency switches (for example in the form of mechanical switches) can be provided which can be used to short-circuit the sub modules in the case of a fault; such emergency switches are not illustrated in the figures, for reasons of clarity.

Figure 8:
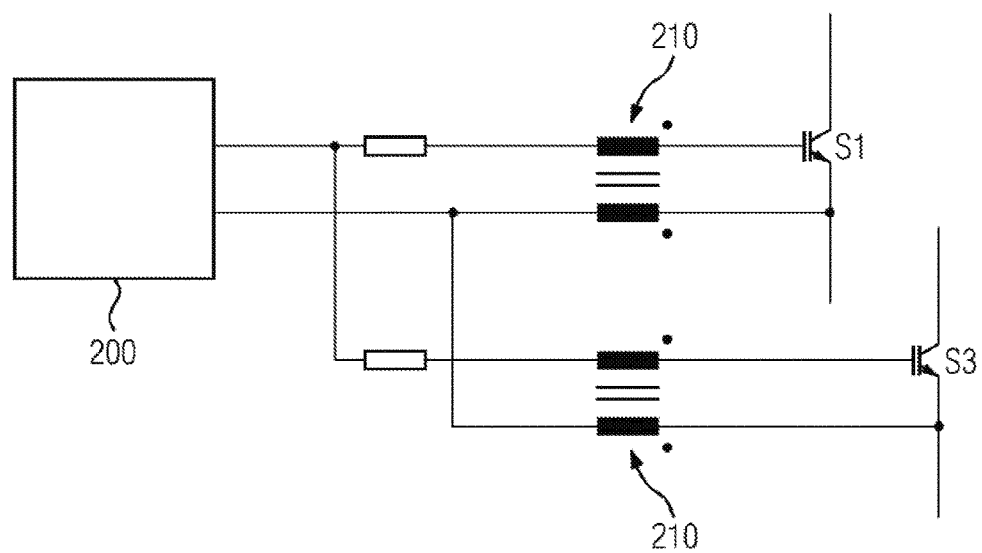
FIG. 8 shows one exemplary embodiment for the driving of switches of the sub modules in accordance with FIGS. 3 to 7.

FIG. 8 shows by way of example a possible driving of the switches S1 to S4 of the two partial modules TM1 and TM2 in accordance with FIGS. 3 to 7 in greater detail, specifically on the basis of the driving of the two first switches S1 and S3 of the two partial modules TM1 and TM2. It can be discerned that the sub module SB is equipped with a sub module-specific driver circuit 200, which is connected both to the first switch S1 of the partial module TM1 and to the first switch S3 of the partial module TM2 in an inductively decoupled manner. The sub module-specific driver circuit enables the two first switches S1 and S3 to be switched on and off synchronously, the driving being effected in an inductively decoupled manner. The inductive decoupling is preferably based on current-compensated inductors, such as are identified in FIG. 8 and by the reference sign 210 therein. The current-compensated inductors 210 preferably have a soft-magnetic core.

The driving of the two second switches S2 and S4 of the two partial modules TM1 and TM2 can be carried out by a corresponding sub module-specific driver circuit.

Although the invention has been more specifically illustrated and described in detail by means of preferred exemplary embodiments, nevertheless the invention is not restricted by the examples disclosed, and other variations can be derived therefrom by the person skilled in the art, without departing from the scope of protection of the invention.

LIST OF REFERENCE SIGNS

10 Multilevel converter
15 Generator
20 Central processor
21 Lines
110 Switch
120 Switch
130 Capacitor
200 Driver circuit
210 Inductors
A1 First partial module terminal
A2 Second partial module terminal
A3 Third partial module terminal
C1 Capacitor
C2 Capacitor
D Inductance
G10a Voltage terminal
G10b Voltage terminal
I1 Inductive element
I2 Inductive element
I3 Inductive element
I4 Inductive element
If1 Discharging current
If2 Discharging current
If3 Discharging current
L1 Inductance
Lp1 Inductance
Lp2 Inductance
RE1 Series connection
R11 External terminal of the series connection R1
R12 External terminal of the series connection R1
RE2 Series connection
R21 External terminal of the series connection R2
R22 External terminal of the series connection R2
RE3 Series connection R31 External terminal of the series connection R3
R32 External terminal of the series connection R3
R1 Ohmic resistance
R2 Ohmic resistance
SB Sub module
SB1 First sub module terminal
SB2 Second sub module terminal
S1 First switch
S2 Second switch
S3 First switch
S4 Second switch
TM1 Partial module
TM2 Partial module
Uc1 Capacitor voltage
Uc2 Capacitor voltage
V1 Connection line
V2 Connection line
V3 Connection line
V4 Connection line
V5 Connection line
W10 AC voltage terminals
Z Intermediate terminal

The invention claimed is:

1. A multilevel converter, comprising:
a plurality of series-connected sub modules each having at least one first switch, one second switch and one capacitor, said sub modules outputting current by way of said capacitor in discharging phases and receiving current for charging said capacitor in charging phases;
at least one of said sub modules having two partial modules or consisting of two partial modules that are galvanically connected to one another via a galvanic connection, each of said partial modules including a first switch, a second switch, a capacitor, a first partial module terminal and a second partial module terminal; and
at least one inductive element disposed in said galvanic connection between said two partial modules, wherein an inductance of said at least one inductive element or a sum of the inductances of said inductive elements in said galvanic connection between said two partial modules is at least five times a magnitude of a sum of parasitic inductances acting in said two partial modules.

2. The multilevel converter according to claim 1, wherein the inductance of said at least one inductive element or the sum of the inductances of said inductive elements in said galvanic connection between said two partial modules is at least ten times the magnitude of the sum of the parasitic inductances acting in said two partial modules.

3. The multilevel converter according to claim 1, wherein:
said first partial module terminals of said partial modules are each galvanically connected to a first sub module terminal of said sub module and to one another; and
said second partial module terminals are each galvanically connected to a second sub module terminal of said sub module and to one another; and
said galvanic connection between said two first partial module terminals and/or between said two second partial module terminals comprises at least one said inductive element.

4. The multilevel converter according to claim 3, wherein an inductance of said at least one inductive element or a sum of the inductances of said inductive elements in said galvanic connection between said two first partial module terminals and/or between said two second partial module terminals is at least five times a magnitude of a sum of parasitic inductances acting in said two partial modules.

5. The multilevel converter according to claim 4, wherein the inductance of said at least one inductive element or the sum of the inductances of said inductive elements in said galvanic connection is at least ten times the magnitude of the sum of the parasitic inductances acting in said two partial modules.

6. The multilevel converter according to claim 1, wherein said partial modules each comprise a third partial module terminal, and said capacitors of said partial modules are galvanically connected with high resistance and/or high inductance with respect to one another via said third partial module terminals.

7. The multilevel converter according to claim 6, wherein an absolute value of an ohmic resistance between said capacitors of said two partial modules is at least a factor of $10^5$ greater than an absolute value of an impedance of said at least one inductive element at 50 Hz or a sum of the absolute values of the impedances of said inductive elements at 50 Hz in said galvanic connection or galvanic connections between said two partial modules.

8. The multilevel converter according to claim 1, wherein:
said at least one sub module comprises said the two partial modules and further partial modules each including a first switch, a second switch, a capacitor, and first and second partial module terminals;
said first partial module terminals of said further partial modules are each galvanically connected to said first sub module terminal of said sub module;
said second partial module terminals of said further partial modules are each galvanically connected to said second sub module terminal of said sub module;
a galvanic connection between said first partial module terminals of said further partial modules and said first sub module terminal and/or a galvanic connection between said second partial module terminals of said further partial modules and said second sub module terminal each including at least one inductive element.

9. The multilevel converter according to claim 8, wherein:
a sum of inductances of said inductive elements in said galvanic connection between said first partial module terminal and said first sub module terminal and in said galvanic connection between said second partial module terminal and said second sub module terminal for each of said partial modules is in each case at least five times a magnitude of a sum of parasitic inductances acting in said partial modules.

10. The multilevel converter according to claim 9, wherein the sum of the inductances in said galvanic connection between said first partial module terminal and said first sub module terminal and in said galvanic connection between said second partial module terminal and said second sub module terminal for each of said partial modules is in each case at least ten times the magnitude of the sum of the parasitic inductances acting in said partial modules.

11. The multilevel converter according to claim 1, wherein:
said at least one sub module comprises a multiplicity of partial modules each having a first switch, a second switch, a capacitor, and first and second partial module terminals;
said first partial module terminals of said partial modules are each galvanically connected to said first sub module terminal of said sub module;

said second partial module terminals of said partial modules are each galvanically connected to said second sub module terminal of said sub module;

a galvanic connection between said first partial module terminals of said partial modules and said first sub module terminal and a galvanic connection between said second partial module terminals of said partial modules and said second sub module terminal each including at least one inductive element.

12. The multilevel converter according to claim 11, wherein:

said capacitors of said partial modules are galvanically connected with high resistance; and an absolute value of an ohmic resistance between said capacitors of in each case two partial modules connected to one another is at least a factor of $10^5$ greater than a sum of absolute the values of impedances at 50 Hz which are formed by said inductive elements that are arranged in said galvanic connections between said two partial modules and said sub module terminals.

13. The multilevel converter according to claim 1, wherein said at least one inductive element or said inductive elements are respectively formed by a separate element.

14. The multilevel converter according to claim 13, wherein said separate element is a separate inductor.

15. The multilevel converter according to claim 1, wherein said at least one inductive element or said inductive elements are formed by parasitic inductances in said galvanic connections between said partial modules.

16. The multilevel converter according to claim 1, wherein said switches of said partial modules are configured to be driven in an inductively decoupled manner.

17. The multilevel converter according to claim 16, wherein:

said at least one sub module or each of said sub modules comprises a first sub module-specific driver circuit and a second sub module-specific driver circuit; and said first switches of said partial modules are driven with inductive decoupling by said first sub module-specific driver circuit and said second switches of said partial modules are driven with inductive decoupling by said second sub module-specific driver circuit.

18. A sub module for a multilevel converter, comprising:

two partial modules that are galvanically connected to one another or being formed by two partial modules that are galvanically connected to one another via a galvanic connection;

each of said partial modules having a first switch, a second switch, a capacitor, a first partial module terminal and a second partial module terminal; and said galvanic connection between said two partial modules including at least one inductive element, wherein an inductance of said at least one inductive element or a sum of the inductances of said inductive elements in said galvanic connection between said two partial modules is at least five times a magnitude of a sum of parasitic inductances acting in said two partial modules.

* * * * *